United States Patent
Bossler

(10) Patent No.: US 6,684,876 B2
(45) Date of Patent: Feb. 3, 2004

(54) LEG SUPPORT FOR BARBECUE KETTLE

(75) Inventor: Martin C. Bossler, Spring Grove, IL (US)

(73) Assignee: CPD Associates, Inc., Winston-Salem, NC (US)

( * ) Notice: Subject to any disclaimer, the term of this patent is extended or adjusted under 35 U.S.C. 154(b) by 0 days.

(21) Appl. No.: 09/911,582

(22) Filed: Jul. 24, 2001

(65) Prior Publication Data

US 2003/0019491 A1 Jan. 30, 2003

(51) Int. Cl.[7] ................................................. A47J 37/07
(52) U.S. Cl. ....................... 126/25 R; 126/9 B; 126/305
(58) Field of Search .............................. 126/25 R, 305, 126/9 R, 9 B; 248/165, 188, 188.8, 188.5; 108/147.21, 156; 403/190, 109.3, 109.8, 322.3, 325, 327

(56) References Cited

U.S. PATENT DOCUMENTS

| | | | |
|---|---|---|---|
| 2,964,123 A | * | 12/1960 | Larson ..................... 248/188.8 |
| 3,488,697 A | * | 1/1970 | Lewandowski et al. ..... 248/188 |
| 3,538,906 A | | 11/1970 | Heraty et al. |
| 5,076,252 A | | 12/1991 | Schlosser et al. |
| 5,279,214 A | | 1/1994 | Lamendola |
| 5,572,983 A | | 11/1996 | Schlosser et al. |
| 5,794,608 A | | 8/1998 | Von Berg |
| 5,931,085 A | * | 8/1999 | Benzschawel .............. 126/9 R |
| 2003/0015186 A1 | * | 1/2003 | McDonald .................. 126/9 R |

FOREIGN PATENT DOCUMENTS

JP      11-70047 A  *  3/1999

* cited by examiner

*Primary Examiner*—Sara Clarke
(74) *Attorney, Agent, or Firm*—Greer, Burns & Crain, Ltd.

(57) ABSTRACT

The present invention relates to an improved barbecue kettle leg support featuring a body that is contoured to fit the curved shape of a barbecue kettle bowl and to receive an end of a leg with a locking formation. Fastener bores are configured for mounting the leg support to the bowl. Preferably, the leg support is mounted midway between the top and bottom of the bowl for increased stability. A keyed bore enables assembly of the leg with the locking formation. The locking formation utilizes a pin which is attached to a bias spring to prevent unwanted detachment of the leg from the leg support. The locking formation is configured to allow assembly and disassembly to be performed without the use of tools.

23 Claims, 4 Drawing Sheets

LEG SUPPORT FOR BARBECUE KETTLE

BACKGROUND OF THE INVENTION

The present invention relates to barbecue kettle grills, and more particularly to the leg configuration of a barbecue kettle grill.

A number of different structures are known for assembling and securing a leg onto a kettle-type barbecue grill. The most common structure is to slidably insert a tubular leg into a mating socket member that has been fixed to the grill as by welding. A friction fit is achieved with a dimple or detent in the socket member which tightly engages the leg.

A first disadvantage of this system is that welding is both a relatively costly and destructive method of attaching one piece to another. During the welding process, the materials joined are usually weakened. Welding is also inherently inaccurate. Dimensional tolerances for welding require additional room for variations caused by the welding process. Also, the cost of welding is relatively high in this application due to the awkwardness of the process in securing a socket to a curved kettle bowl surface. Cost, accuracy and strength of the welding process could be improved upon by incorporating another way of attaching the leg to the grill which eliminates welding all together.

A second disadvantage of the conventional barbecue kettle leg attachment is that the grill assembly requires that the leg and the welded socket member have an interference fit relationship. If the manufacturing tolerances are too tight, there may be difficulty in assembly. Removing the interference fit of the leg to the mating grill member will improve the ease of assembly, as well as disassembly, if required.

In an effort to address the drawbacks of the welded leg support member mentioned above, it is also known to attach the leg to a barbecue kettle grill by using a single bolt, typically passing through the lower kettle portion or bowl and threadably engaging a captured nut in the upper end of the leg. This assembly makes it relatively easy to assemble, but since a single bolt is used, the strength of the joint could be questioned depending on how tight the bolt has been turned by the installer. Also, since there is less support for the leg, the stability of the leg is reduced compared to the welded system described above. Improving the relationship between the grill and the leg will reduce or eliminate the vibration, stripping, stability and strength issues presented by the prior art.

Grills of this type encounter stability problems when the grill is placed on a curved surface such as a driveway, patio, deck, lawn, or any typical surface where a grill may be found standing. This is caused, in some cases, by the high center of gravity established by the grill due to the configuration of the legs. The legs are placed close to the bottom of the grill to incorporate a straight leg design and maintain a grill base footprint that does not interfere with the operation of the grill. In other cases, instability is caused due the use of four legs. Utilization of four legs is inherently less stable on uneven surfaces. Lowering the center of gravity and utilizing three legs on a kettle-type barbecue grill will improve the stability of the grill on uneven surfaces.

Accordingly, a first object of the present invention is to provide an improved barbecue kettle leg support configuration that features a body which does not require welding for attachment.

Another object of the present invention is to provide an improved kettle-type barbecue grill leg support that features a locking mechanism that replaces the prior interference fit and allows for ease of assembly and disassembly of the leg.

Still another object of the present invention is to provide an improved kettle-type barbecue grill leg support that features a mounting position which allows for a lower center of gravity, causing an increase in overall stability of the grill.

BRIEF SUMMARY OF THE INVENTION

Accordingly, the above listed objects are met or exceeded by the present improved barbecue kettle leg support, featuring a body which, at a first end, is contoured to fit the curved, or spheroidal, shape of the bowl. A second end, opposite the first end, of the leg support is configured with a bore to receive an end of a leg. A center portion, generally positioned between the first and second end, is provided with a throughbore in communication with the second end bore to receive a corresponding locking engagement from the end of the leg. The locking mechanism is positive, yet releasable, and avoids the fit problems identified with the prior art.

In the preferred embodiment, the leg support is generally "L"-shaped, and at the first end, has three fastener bores, spaced apart from each other, for mounting to the bowl. Also, at the second end, the leg support is preferably provided with a keyed bore, generally cylindrical in shape, which receives a leg with a locking formation. A release recess and a throughbore that communicates with the keyed bore is preferably housed by the central portion of present the leg support.

Another feature of the present barbecue leg support is a leg with an upper end housing a locking formation. Preferably the locking formation is a pin that is biased by a spring forcing the pin to extend radially through an opening in the leg. A keyed bore is dimensioned to provide a rotational interface with respect to the leg and locking formation. Upon assembly, the pin from the locking formation radially extends through the leg and the throughbore in the leg support.

In addition to the barbecue kettle, leg support and leg, the kettle-type barbecue is provided with a tray or shelf-like base configured to allow engagement of a lower end of at least one leg. Also, the present base is preferably configured to define a line between two leg lower ends that is longer than a width of the barbecue kettle itself.

The present barbecue kettle is configured with a bowl that has a top and bottom. The bowl is configured to allow for assembly of at least one leg support half way between the top and bottom of the bowl.

DETAILED DESCRIPTION OF THE INVENTION

Figure 1:
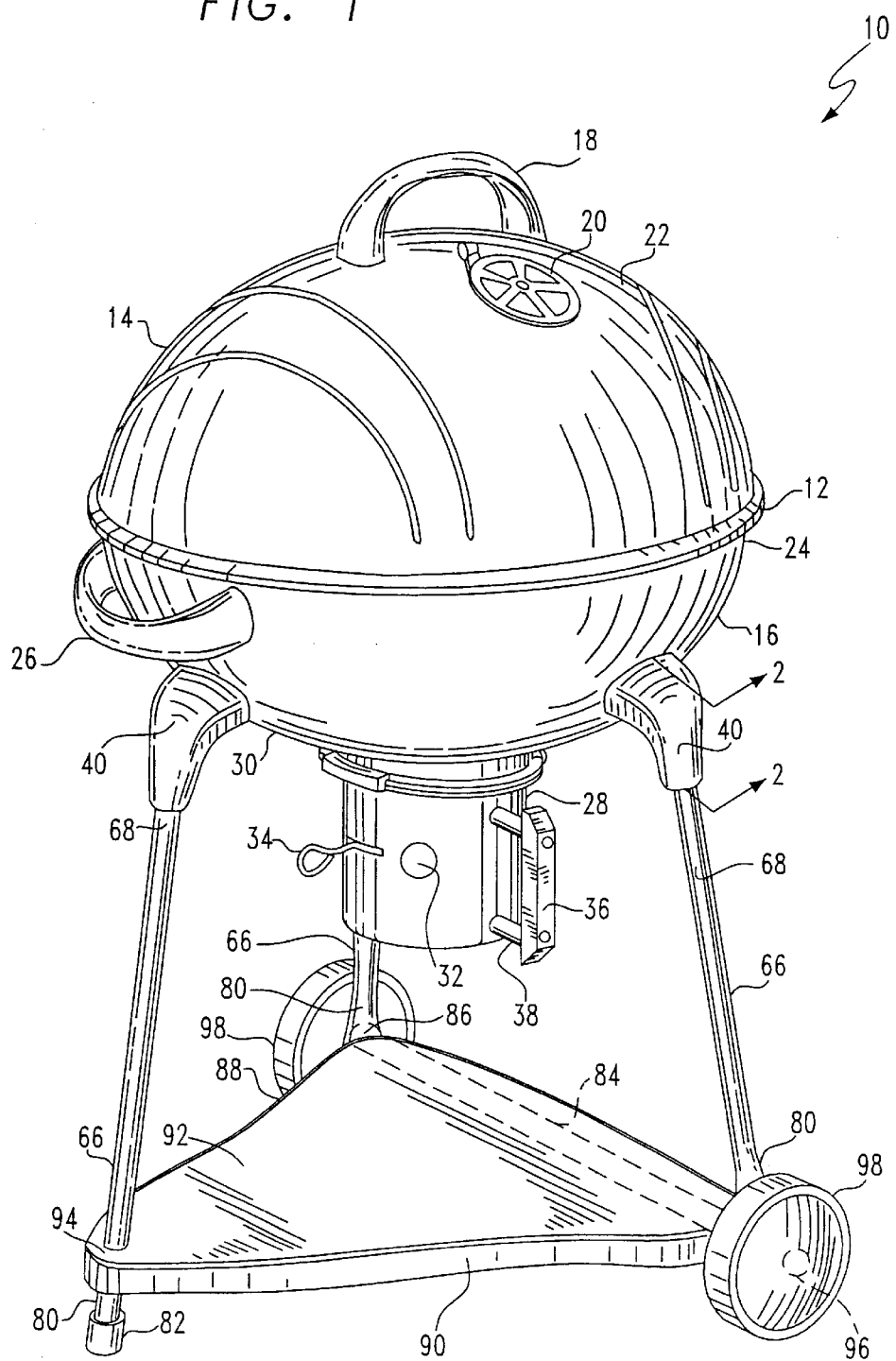
FIG. 1 is a perspective view of an embodiment of a kettle-type barbecue with a leg support configuration made in accordance with the teachings of the present invention.

Referring now to FIG. 1, a kettle-type barbecue is generally designated 10 and includes a barbecue kettle 12. The barbecue kettle 12 generally consists of a lid 14 and a bowl 16 which are made of porcelainized or powder coated metal. Generally, the lid 14 has a handle 18 and a vent 20, both of which are preferably located near a lid top 22, however other locations are contemplated depending on the application. Preferably, the handle 18 is used to manipulate the lid 14, and the vent 20 is used to control the airflow through the lid 14. Generally, the lid 14 rests upon a bowl upper surface 24 to provide a closed cooking chamber. As is well known in the art, a food support grill (not shown) rests near the bowl upper surface 24. Also, a separate charcoal support grid (not shown) is typically placed below the food support grill. A transport handle 26 is attached to the bowl 16 near the bowl upper surface 24. During transportation of the kettle-type barbecue grill 10, the transport handle 26 is used for added convenience and control over position of the grill 10.

An ash receiver 28 is descendably mounted to a bowl lower surface 30 and circumscribes a lower opening (not shown) in the bowl 16. Generally, an inexpensive metal, cylindrical container serves well as the ash receiver 28 because of ease of manufacturing. To regulate the flow of combustion air to the fire, the ash receiver 28 preferably includes multiple air vents 32 which can alternatively be located in the bowl 16. An air vent controller 34, preferably an apertured ring which selectively blocks the vents 32, optionally controls the volume of incoming air for combustion. Any material may be used to construct the ash receiver 28, as long as it will withstand the temperature of hot ash and small burning embers from the fire. Metal, especially when coated with a protective coating such as porcelain, or other ceramic coating, is preferred. An ash receiver handle 36 is preferably mounted on the ash receiver 28 with standoffs 38 as insulation to simplify emptying the ash receiver when hot.

In the preferred embodiment, the bowl 16 is configured to receive three leg supports 40. The three leg supports 40 are fastened in spaced relationship about the bowl 24, and are preferably bolted. As shown, the leg supports 40 are positioned generally mid-way between the bowl upper end 24 and the bowl lower end 30. This mounting configuration generally lowers the center of gravity of the kettle-type barbecue grill 10, which generally increases stability.

Referring now to FIGS. 1 through 4, the leg support 40 is dimensioned with a first end 42, a second end 44 and a center portion 46. In the preferred embodiment, the support leg 40 is generally made from a die castable material such as aluminum or equivalent which is suited to withstand the rigorous outdoor operational environment of the kettle-type barbecue grill 10. Preferably, the leg support 40 is generally "L"-shaped when viewed from the side, and defines an angle α in the approximate range of 140° to 160° (shown in FIG. 2). Other angular dimensions are contemplated.

In the preferred embodiment, the first end 42 is contoured to fit the generally curved or spheroidal-shaped bowl 16. A continuous periphery 48, which is generally triangularly-shaped when viewed head on (FIG. 3), is the preferred shape of the first end 42. However, other shapes are contemplated depending on the application. Another feature of the continuous periphery 48 is that it matches the contour of the bowl 16. A result of the matching contour is a generally equal distribution of load transmitted from the bowl 16 to the leg support 40. Having a generally uniform distribution of load between the leg support 40 and bowl 16 generally increases the reliability of this joint.

Figure 2:
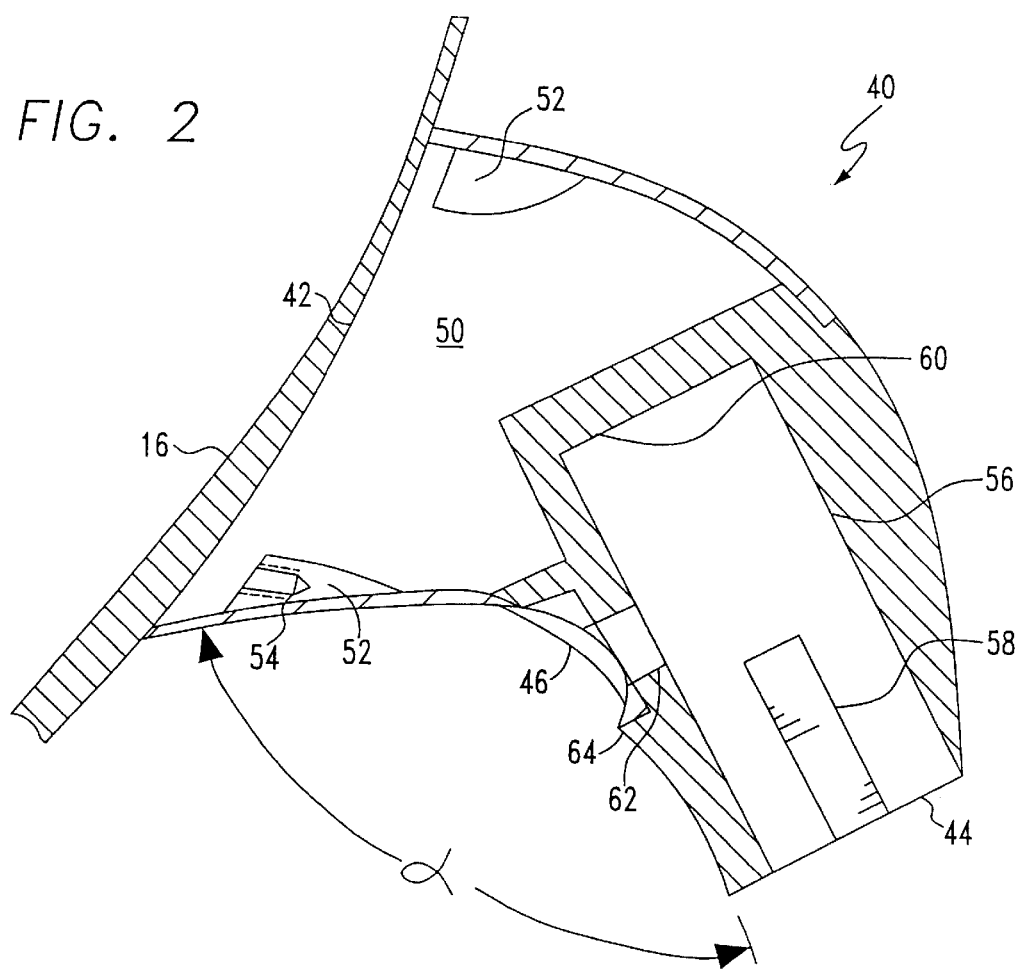
FIG. 2 is a cross-sectional view of the leg support of FIG. 1 taken along the line 2—2 and in the direction indicated generally.

Preferably, the first end 42 defines a cavity 50 (best seen in FIG. 2). In the preferred embodiment, the cavity 50 is dimensioned to reduce the weight and cost of the leg support 40. Also, the cavity 50 is dimensioned to facilitate manufacturability of the leg support 40.

Additionally, the first end 42 is provided with at least one fastener bore 52. Preferably, the first end 42 is provided with three fastener bores 52 that are housed within the cavity 50 (shown in FIG. 3). Generally, having the fastener bores 52 housed within the cavity 50 enhances the esthetics of the leg support 40. In the preferred embodiment the fastener bores 52 are configured with an internal thread 54 (shown best in FIG. 2). Generally, the internal thread 54 is dimensioned to allow communication with a standard bolt (not shown) used to attach the leg support 40 to the bowl 16. Utilizing three fastener bores 52 generally increases the strength and stability of the attachment of the leg support 40 to the bowl 16, and reduces the effects of vibration on the bolts. Tapping the fastener bores 52 with the internal thread 54 generally reduces stripping of the bolt.

Figure 4:
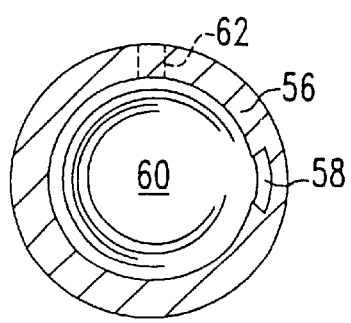
FIG. 4 is a fragmentary cross-sectional view of the leg support of FIG. 3 taken along the line 4—4 and in the direction indicated generally.

In the preferred embodiment, the second end 44 is provided with a bore 56 and a key-way 58 (best seen in FIG. 4). Generally, the bore 56 is cylindrically shaped and extends in a direction perpendicular to a plane defined by the second end 44. Preferably, the key-way 58 is ramped or angled with respect to the bore 56. As shown, the bore 56 has a blind end 60.

In the preferred embodiment, the center portion 46 is generally located between the first end 42 and the second end 44. Preferably, the center portion 46 is provided with a throughbore 62 coaxial with a release recess 64. Generally, the throughbore 62 is radially positioned and in communication with the bore 56 generally near the blind end 60 (shown best in FIG. 2).

Figure 5:
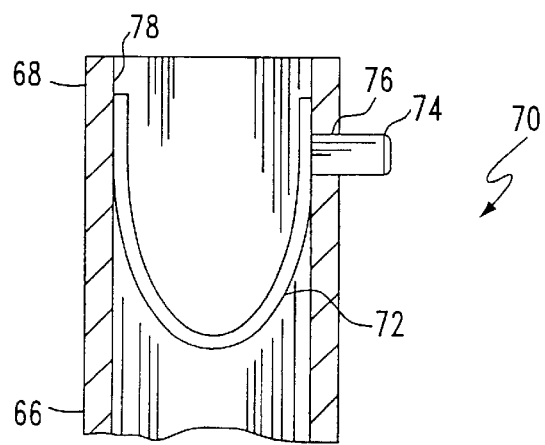
FIG. 5 is a fragmentary vertical section view of an upper end of the present leg including a locking formation.
Figure 3:
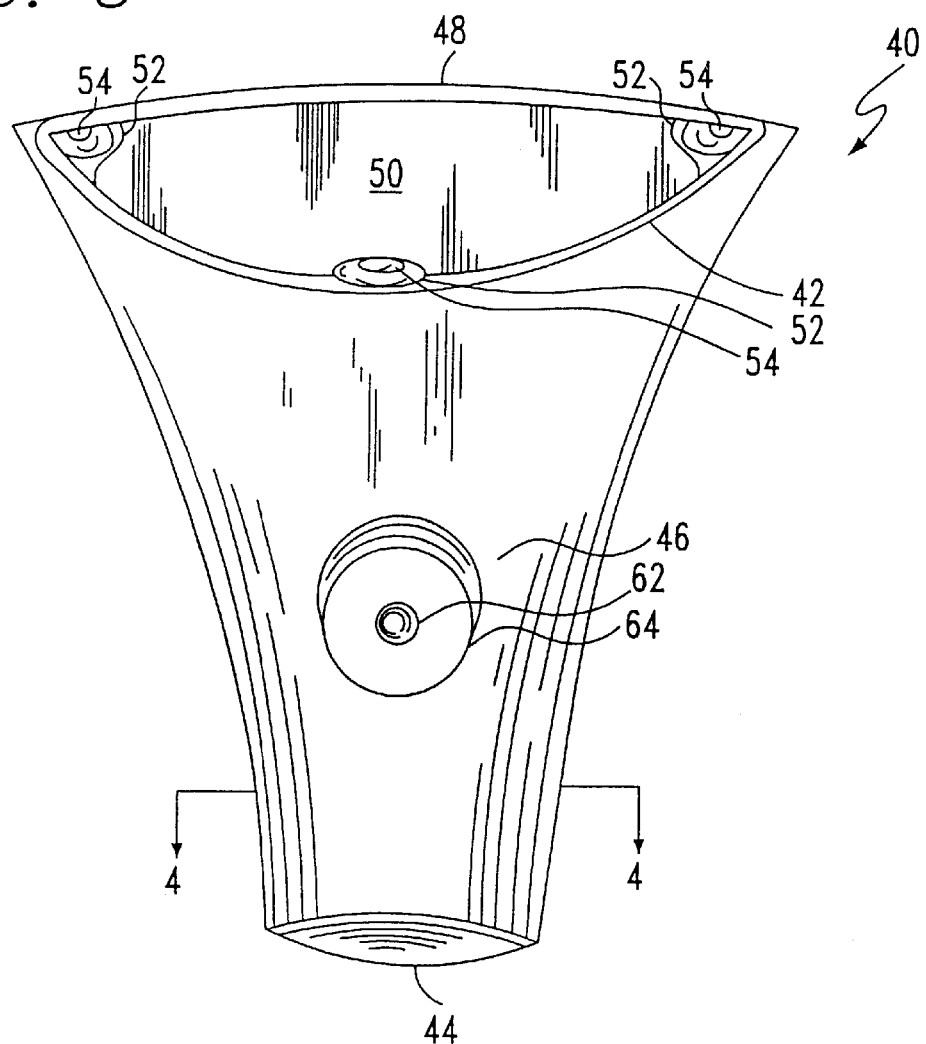
FIG. 3 is a front view of the leg support of FIG. 1.

Referring now to FIGS. 1 and 5, the kettle-type barbecue grill 10 includes three legs 66. Generally, the legs 66 are tubular shaped, straight, and made of a metal that is both durable and lightweight, preferably aluminum. Other materials are contemplated depending on the application. In the preferred embodiment, each leg 66 is provided with an upper end 68 that houses a locking formation 70 (shown in FIG. 5). In the preferred embodiment, the locking formation 70 includes a compression spring 72 and a pin 74. Generally, the compression spring 72 is a bent piece of spring-steel to which the pin 74 has been stamped, making the spring 72 and the pin 74 one piece. A slot or aperture 76 is provided in the upper end 68, and is preferably dimensioned to allow the pin 74 to freely pass through the slot. Slidably assembling the compression spring 72 and the pin 74 into the upper end 68 generally forces the pin 74 radially through the slot 76. Generally, the compression spring 72 contacts two sides of an inner wall 78 of the leg 66 which causes the pin 74 to be biased radially through the slot 76. Alternatively, other types of biased, lug-like projections are contemplated, including spring balls, spring-biased pins, etc. as are known in the art.

Referring again to FIGS. 1 through 5, the locking formation 70 is slidably and rotatably inserted to the leg support 40. Generally, the bore 56 is dimensioned to allow for a slip fit with the upper end 68. Depressing the pin 74 and aligning it with the key-way 58 allows the locking formation 70 to interface with the leg support 40 via the bore 56. Once inside the bore 56, the pin 74 is released to ride freely on the key-way 58 and the leg 66 is pushed toward the blind end 60 until the upper end 68 contacts the blind end 60. Preferably, the leg 66 is then rotated to align the pin 74 with the throughbore 62. Once the pin 74 is aligned with the throughbore 62, the pin 74, which is biased by the spring 72, radially extends through the slot 76 and throughbore 62. This extrusion of the pin 74 through the throughbore 62 creates a lock which prevents the leg 66 from becoming detached from the leg support 40. An advantage of the present invention is that the length of the pin 74 is such that it is flushly received in the throughbore 62 and does not protrude past the outer edge of the throughbore. Thus, inadvertent jostling or depression of the pin is prevented which could cause unwanted disengagement of the leg 66 from the leg support 40.

If for some reason detachment of the leg 66 is required, such as for disassembly of the kettle-type barbecue grill 10, the pin 74 is depressable to overcome the biasing force of the spring 72 and disengage the pin 74 from the throughbore 62. Once the engagement is released, the leg 66 can be detached from the leg support 40 by linearly moving the upper end 68 away from the blind end 60.

It will be appreciated that the present leg support 40 and the legs 66 are assembled and disassembled without tools. The time required to perform the assembly of the kettle-type barbecue grill 10 is greatly reduced due to the lack of the need for tools.

Referring again to FIG. 1, the legs 66 each have a lower end 80. Generally, the lower end 80 is either provided with an interface for a foot 82 or an axle 84. The foot 82 generally has the tubular shape of the leg 66 at the lower end 80. Preferably, the foot 82 is cylindrical shaped and made out of either plastic, rubber or equivalent resilient material. The foot 82 is press fit onto the lower end 80. Assembly of the foot 82 generally reduces the amount of movement of the kettle-type barbecue grill 10 during operation. An axle interface 85 (FIG. 6) is generally flat and is provided with a throughhole 86. Generally, the throughhole 86 is dimensioned to allow the axle 84 to pass freely through the throughhole.

A base 88 is also provided with the kettle-type barbecue grill 10. Generally, the base 88 is generally triangular-shaped when viewed from above and is provided with a skirt 90, a storage surface 92 and a leg hole 94. The leg hole 94 is located at one point of the triangular shaped base 88 and is in a co-planar relation to the storage surface 92. Preferably, the leg hole 94 is dimensioned to accommodate one of the legs. In the preferred embodiment, the leg 66 that passes through the leg hole 94 receives the foot 82. Generally, the skirt 90 is perpendicular to, and describes the perimeter of the storage surface 92. On each corner opposite the leg hole 94 corner, the skirt 90 is provided with a flange hole 96. Preferably, the flange hole 96 is in a planar relation to the flange 90 and is dimensioned to freely and rotatably accommodate the axle 84. Thus, the base 88 ties all three legs 66 together, which generally increases the stability of the kettle-type barbecue grill 10.

Figure 6:
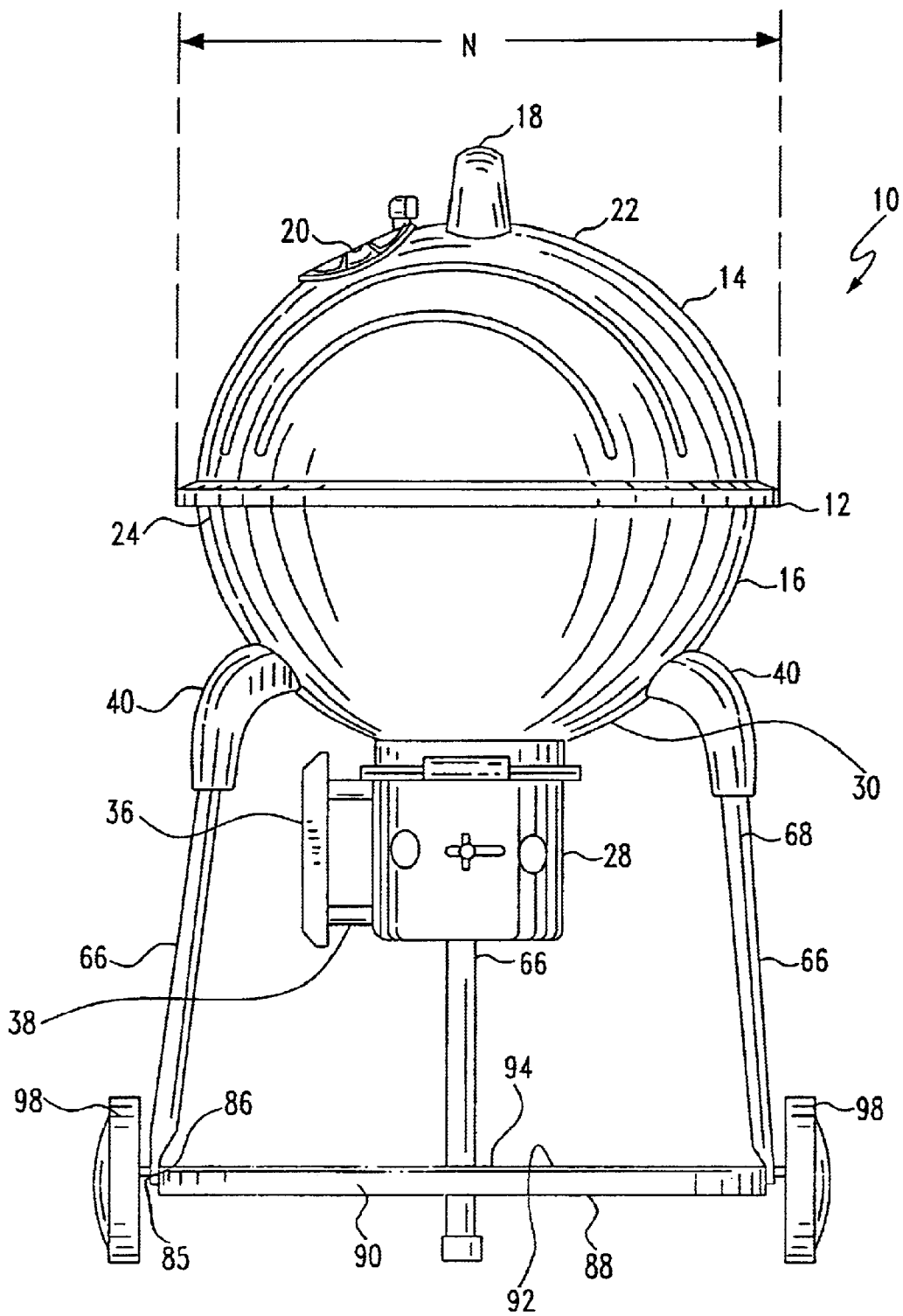
FIG. 6 is a rear elevational view of the kettle-type barbecue of FIG. 1.

Furthermore, referring now to FIGS. 1 and 6, the kettle-type barbecue grill 10 is configured with generally two wheels 98. Generally, the wheels 98 are configured to be fastened upon corresponding ends of the axle 84. This locking interface between the axle 84 and the wheels 98 allows the kettle-type barbecue grill 10 to be easily transported. Generally, the wheels 98, two legs 66 and the base 88 define a line L that is longer than a width W of the bowl 16 (shown in FIG. 6). This longer line L generally increases the stability of the kettle-type barbecue grill 10.

While specific embodiments of the leg support for a barbecue kettle of the present invention have been shown and described, it will be appreciated by those skilled in the art that changes and modifications may be made thereto without departing from the invention in its broader aspects and as set forth in the following claims.

What is claimed is:

1. A leg support for a barbecue kettle with an outer wall, comprising:
   a body with a first end defining a bowl engagement formation, a second end defining a bore configured for receiving an end of a leg, and a central portion located between said first and second ends and having a throughbore in communication with said bore and said central portion having a release recess.

2. The leg support of claim 1 wherein said body is generally "L"-shaped when viewed from the side.

3. The leg support of claim 1 wherein said first end is dimensioned for including at least one fastener bore.

4. The leg support of claim 3 wherein said first end is dimensioned for including three fastener bores in spaced relationship to each other.

5. The leg support of claim 1 wherein said first end defines a continuous periphery bowl engagement surface.

6. The leg support of claim 5 wherein said continuous periphery bowl engagement surface is contoured to match a contour of said outer wall.

7. The leg support of claim 1 wherein said second end defining said bore is keyed.

8. The leg support of claim 1 wherein said body is configured to define an angle in the approximate range of 140° to 160°.

9. A combination leg and leg support for a barbecue, comprising:
   a body with a first end defining a bowl engagement formation, a second end defining a bore configured for receiving an end of a leg, and a central portion located between said first and second ends;
   an elongated leg having an upper end configured for engaging said second end;
   said second end and said upper end being configured with a locking formation for establishing a mating engagement with each other for preventing unwanted disengagement of said leg from said body; and
   said locking formation is biased and extends radially from said leg.

10. The combination of claim 9 wherein said upper end is provided with said locking formation.

11. The combination of claim 9 wherein said second end defines a keyed bore having a blind end and is generally cylindrical in shape for rotatably receiving said upper end and said locking formation.

12. The combination of claim 9 wherein said locking formation has a compression spring attached to a pin and located within said leg.

13. The combination of claim 9 wherein said central portion has a release recess and said throughbore is dimensioned to flushly receive said locking formation.

14. The combination of claim 9 wherein a keyed bore is provided in said body and is configured to receive said locking formation, and said throughbore is aligned with said locking formation to receive said pin upon rotation of said leg.

15. A combination barbecue kettle, leg support, leg and a base for a barbecue, comprising:
   a barbecue kettle with a bowl and a lid, said bowl being configured for receiving said lid;
   at least one leg support with a body having a first end defining a bowl engagement formation, a second end defining a bore configured for receiving an end of a leg, and a central portion located between said first and second ends and having a throughbore in communication with said bore; and an elongated leg having an upper and lower end, said upper end configured for engaging said second end, said upper end being provided with a locking formation, said lower end configured for engaging a base.

16. The combination of claim 15 wherein said base being configured to receive at least one said leg.

17. The combination of claim 15 wherein said kettle has a width and a length and at least two of said lower ends define a line which is longer than said width.

18. The combination of claim 15 wherein said bowl has a top and a bottom and at least one said leg support is located approximately midway between said top and bottom.

19. The combination of claim 15 wherein said barbecue kettle is generally spheroidal in shape.

20. A leg support for a barbecue kettle with an outer wall, comprising:

a body with a first end defining a bowl engagement formation, a second end defining a bore configured for receiving an end of a leg, and a central portion located between said first and second ends and having a throughbore in communication with said bore and said second end defining said bore is keyed.

21. The leg support of claim 20 wherein said keyed bore has a blind end and is generally cylindrical in shape for receiving a corresponding end of a leg.

22. A combination leg and leg support for a barbecue, comprising:

a body with a first end defining a bowl engagement formation, a second end defining a bore configured for receiving an end of a leg, and a central portion located between said first and second ends;

an elongated leg having an upper end configured for engaging said second end;

said second end and said upper end being configured with a locking formation for establishing a mating engagement with each other for preventing unwanted disengagement of said leg from said body; and said central portion having a release recess and said throughbore is dimensioned to flushly receive said locking formation.

23. A combination leg and leg support for a barbecue, comprising:

a body with a first end defining a bowl engagement formation, a second end defining a bore configured for receiving an end of a leg, and a central portion located between said first and second ends;

an elongated leg having an upper end configured for engaging said second end;

said second end and said upper end being configured with a locking formation for establishing a mating engagement with each other for preventing unwanted disengagement of said leg from said body; and a keyed bore is provided in said body and is configured for receiving said locking formation, and said throughbore is aligned with said locking formation to receive said pin upon rotation of said leg.

* * * * *